Dec. 19, 1944.   V. R. CARLISLE   2,365,625
SAFETY DEVICE FOR VEHICLE PASSENGERS
Filed Dec. 22, 1941

WITNESSES
Nils E. Goodrich
Clementine De Benedetti

INVENTOR.
Vernon R. Carlisle
BY
HIS ATTORNEY

Patented Dec. 19, 1944

2,365,625

UNITED STATES PATENT OFFICE 2,365,625

SAFETY DEVICE FOR VEHICLE PASSENGERS

Vernon R. Carlisle, Kenosha, Wis.

Application December 22, 1941, Serial No. 423,939

5 Claims. (Cl. 155—189)

This invention relates to improvements in safety devices or guards for passengers of vehicles, and more particularly to improvements in safety devices in respect to seats for vehicles such as passenger automobiles, buses, train and trucks and is a continuation in part of my prior application, Serial No. 227,032, filed August 27, 1938, now Patent Number 2,267,373, issued December 23, 1941.

Long observation and study on the part of the applicant has led him to the conclusion that a large number of fatalities and injuries could be avoided if proper safety devices were placed on the seats of vehicles and if the persons using the seats utilize the safety devices. As is well known, when a vehicle is in a collision the vehicle may be stopped but the tendency of the body of a passenger is to move forward and crash through a windshield, etc., or against some other object causing injury or fatality. It is believed that there is no more effective way to minimize injuries and fatalities resulting from accidents than by furnishing proper safety devices for said vehicles. To that end, it has been an object of my invention to provide safety devices for vehicles such as straps or other similar devices which will effectively limit the movement of an occupant of a vehicle which is stopped in collision so as to prevent or minimize injury to the occupant.

Another object has been to provide safety devices of this kind which may be easily utilized and which may be adjusted and which may be arranged out of the way when not in use.

Another object has been to provide safety devices of the kind described which are inexpensive to produce and simple to attach and install.

These and other objects and advantages will appear more fully in the hereinafter specification when taken in connection with the accompanying drawing, in which.

Figure 1:
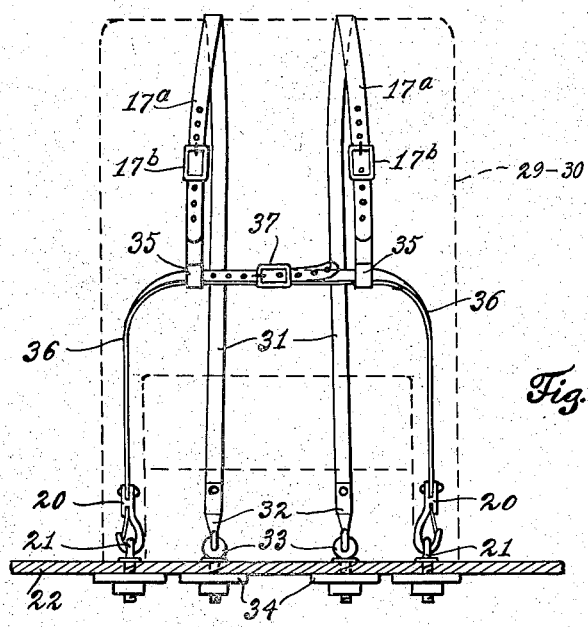
Fig. 1 is a front view showing a safety device applied to a seat.

In the drawing a form of the invention is shown in which a pair of vertical straps 17a are provided for each passenger or person reposed on a seat and the front portions of these straps provided at their lower ends with loops or the like 35 to receive horizontal or cross portions of inverted V-shaped straps or belts 36 which have their lower ends fastened to the floor of the car indicated at 22 and in which floor 22 are secured eyebolts 21. Hooks or snap fasteners 20, carried at the extremities of the straps 36, cooperate with the eyebolts 21 to effect the anchorage. A pair of straps 36 are provided for each passenger to extend over or across the thighs to hold the passenger in the seat, the lower portions of the straps being vertical and the upper portions curved horizontally inwardly. At their inner ends, an adjustable buckle connection 37 is provided so that they may be adjustably connected at their free ends to suit different passengers. Also, the straps 17a are made up of two sections having adjustable buckle connection or the like 17b for adjustment as to length. By this construction a passenger is effectively held down in the seat by the horizontal strap or belt and the vertical straps being over the shoulders keep the body and head from being thrown forward and injured or the chest crushed against a part of the car or steering wheel. Also, by reason of the loops or the like 35 and buckles 17b and 37, proper conformity of straps 17a and 36 to the body and thighs is insured. Also, by having all straps fastened to the floor of the car with the reinforcing washers or plates beneath the floor as in Fig. 1 a strong effective anchoring means is provided which will not pull loose. This is of great practical importance in as much as all previous devices fastened to the back or top of the seat so that if the force of gravity tore the seat loose in case of an accident or impact in a collision the device would fail whereas in the present instance this would not happen since the fastening means is separate or independent of the seat attachment means. Especially is this effective in withstanding the force of the impact when cars in a collision are suddenly stopped and due to inertia, the body will be thrown forward and tear the connections loose with ordinary fastenings which will be prevented by the present device. In other words the passengers will be held on the seat and not crushed or thrown up against some unyielding death-dealing part of the car or interior thereof such as steel posts, the dash, top or shatter-proof glass.

Figure 2:
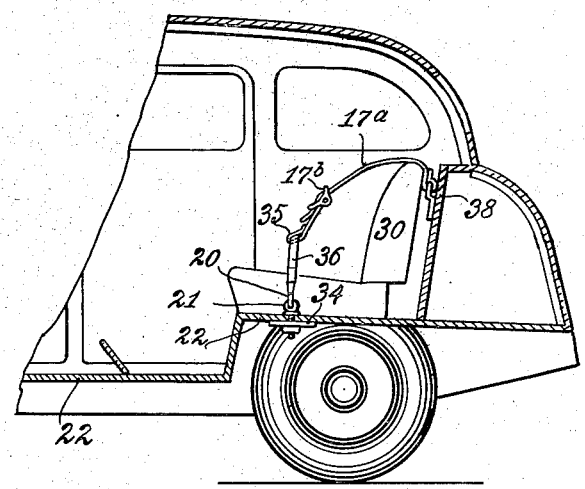
Fig. 2 is a side view of an automobile partly in section with the safety device applied.

In Fig. 2 of the drawing the device is shown only in connection with the rear seat and in this instance the straps 17a instead of being anchored to the floor are shown anchored to the rear wall 38 of the body in back of the rear seat and in front of the luggage compartment. However, the fastening means for the straps 17a and 36 may be anchored to the floor the same as straps 31 in Fig. 1 and made permanent instead of detachable. As shown in Fig. 1 eyebolts 33 are securely affixed to the floor 22. Loops 32 on the extremities of straps 31 cooperate with the "eyes" of the eyebolts to establish the anchorages. Whether or not the snap fasteners or loops 32 and the eyebolts 33 are provided as in Fig. 1, and the latter anchored by nuts as usual or by upsetting the ends of the bolts, the reinforcing washers or plates 34 of considerable size are still provided to prevent the connections from pulling out or loose so that unless special precautions are taken to anchor the straps at the brackets 16 and the seats to prevent them from pulling loose, the connections of the straps to the floor at the back of the seats or to the rear wall will give much stronger anchoring means.

While I have illustrated and described the preferred forms of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In a safety device of the kind described for a seat of a vehicle, a pair of straps extending downwardly from the top of the seat back in front of the seat back and extending over the top of the seat back and anchored at their rear ends to the floor of the vehicle, and a pair of straps anchored to the floor near the bottom of the seat adjacent the front at the sides thereof and slidably engaging the lower front ends of the first straps and connected therebetween.

2. A safety device for vehicles including a pair of adjustable straps extending downwardly from the top of the seat back in front of the seat back, extending over the top of the seat back, and downwardly at the back thereof and anchored to the floor of the vehicle, the lower ends of the front portions of the straps having loops, and a pair of straps anchored to the floor adjacent the front of the seat and turned inwardly to extend over the thighs of a person on the seat, through said loops and adjustably connected together.

3. A safety device for vehicles including a pair of lengthwise adjustable straps having their lower rear ends secured in back of the seat back and extending downwardly from the top of the seat back over the front of the seat back, said straps having the lower ends of the front portions thereof provided with loops and a lengthwise adjustable cross strap between said first mentioned straps and extending through the loops to extend across the chest or waist of a person reposed on the seat and having their lower ends anchored to the floor adjacent the sides and front of the seat.

4. In a safety device of the kind described for a seat for a vehicle, a pair of straps extending downwardly from the top of the seat-back at th front of the seat-back, extending over the top of the seat-back and anchored at their rear ends to the body of the vehicle, and a pair of straps anchored to the floor of the vehicle near the bottom of the seat at the sides thereof and slidably engaging with the lower front ends of the first straps and connected therebetween.

5. In a safety device for a seat of a vehicle, a pair of straps extending downwardly from the top of the seat-back in spaced relation at the front of the seat-back, extending over the top of the seat-back and anchored at their lower rear ends to the body of the vehicle in the rear of the seat-back, and a pair of straps anchored to the floor near the front of the seat, extending upwardly and inwardly and slidably connecting with the lower front ends of the first straps and adjustably connected between the latter.

VERNON R. CARLISLE.